United States Patent
Wolf et al.

(10) Patent No.: US 6,852,925 B2
(45) Date of Patent: Feb. 8, 2005

(54) FEED-THROUGH ASSEMBLIES HAVING TERMINAL PINS COMPRISING PLATINUM AND METHODS FOR FABRICATING SAME

(75) Inventors: William D. Wolf, St. Louis Park, MN (US); Joseph F. Lessar, Coon Rapids, MN (US); Lynn M. Seifried, Minneapolis, MN (US); Lea A. Nygren, Bloomington, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 10/444,488

(22) Filed: May 23, 2003

(65) Prior Publication Data

US 2004/0231877 A1 Nov. 25, 2004

(51) Int. Cl.[7] .................................................. H01J 5/00
(52) U.S. Cl. ................ 174/50.6; 174/50.56; 174/50.61; 361/302
(58) Field of Search ......................... 174/50.6, 152 GM, 174/151, 50.56, 50.61, 50.63; 361/302, 303, 307; 29/25.42

(56) References Cited

U.S. PATENT DOCUMENTS

| | | | |
|---|---|---|---|
| 3,204,023 A | * | 8/1965 | Harmon et al. ............. 174/52.5 |
| 3,920,888 A | * | 11/1975 | Barr ..................... 174/152 GM |
| 4,336,416 A | * | 6/1982 | Goodsell ..................... 174/48 |
| 4,352,951 A | | 10/1982 | Kyle |
| 4,421,947 A | | 12/1983 | Kyle |
| 4,452,033 A | * | 6/1984 | Scramuzza ................. 174/52.4 |
| 4,456,786 A | | 6/1984 | Kyle |
| 4,514,207 A | | 4/1985 | Kyle |
| 4,516,820 A | | 5/1985 | Kuzma |
| 5,046,242 A | | 9/1991 | Kuzma |
| 5,294,241 A | | 3/1994 | Taylor et al. |
| 5,406,444 A | | 4/1995 | Selfried et al. |
| 5,531,003 A | | 7/1996 | Seifried et al. |
| 5,571,146 A | | 11/1996 | Jones et al. |
| 5,632,085 A | | 5/1997 | Tegeder |
| 5,817,984 A | | 10/1998 | Taylor et al. |
| 5,821,011 A | | 10/1998 | Taylor et al. |
| 5,844,198 A | | 12/1998 | Jones et al. |
| 5,866,851 A | | 2/1999 | Taylor et al. |
| 5,870,272 A | | 2/1999 | Seifried et al. |
| 5,871,513 A | | 2/1999 | Taylor et al. |
| 5,906,635 A | | 5/1999 | Maniglia |
| 6,008,980 A | | 12/1999 | Stevenson et al. |

* cited by examiner

*Primary Examiner*—Dhiru R. Patel
(74) *Attorney, Agent, or Firm*—Paul H. McDowall (57) ABSTRACT

A feed-through assembly for an IMD and a method for fabricating the same are provided. The feed-through assembly has a ferrule having a first aperture disposed therethrough. An insulating member is disposed at least partially within the first aperture. The insulating member has a second aperture, an inside surface and an outside surface. A metallization region overlies at least a portion of the inside surface and at least a portion of the outside surface of the insulating member. The metallization region is formed of a first layer of titanium and a second layer of niobium. A portion of a terminal pin of platinum is disposed through the second aperture. A first brazing seal is disposed between the insulating member and the ferrule and a second brazing seal is disposed between the insulating member and the terminal pin. The first and second brazing seals are formed of gold.

36 Claims, 5 Drawing Sheets

FEED-THROUGH ASSEMBLIES HAVING TERMINAL PINS COMPRISING PLATINUM AND METHODS FOR FABRICATING SAME

CROSS REFERENCE TO RELATED APPLICATION

The present patent application relates to co-pending non-provisional U.S. patent application Ser. No. 10/445,069 filed on even date herewith and entitled, "Brazing Fixtures and Methods for Fabricating Brazing Fixtures used for Making Feed-through Assemblies" the content of which are incorporated herein.

FIELD OF THE INVENTION

The present invention generally relates to feed-through assemblies for electrochemical cells, hermetically sealed medical devices and the like, and more particularly relates to such feed-through assemblies having terminal pins comprising platinum and methods for fabricating same.

BACKGROUND OF THE INVENTION

Numerous applications exist where it is necessary to penetrate a sealed container with one or more electrical leads so as to provide electrical access to and from electrical components enclosed within. One such application for which the present invention has particular but not limited utility is for an electrochemical cell or for an IMD (IMD). Such an IMD may comprise for example, an implantable drug pump, an implantable sensor capsule, a cochlear implant, an implantable pulse generator (IPG) such as those adapted for providing deep brain stimulation, nerve stimulation, electrical pacing therapy and cardiac rhythm management techniques (e.g., for delivering electrical stimulation therapy for various cardiac arrhythmias). All such devices, including discrete electrochemical cells, are intended to be covered under the rubric of IMD. A typical IMD have one or more housing or encasement members for isolating the active contents of an electrochemical cell (e.g., battery or capacitor) which is coupled to the electrical components within and/or coupled to the IMD. The IMD typically has at least two major outer housing members that form a hermetically sealed canister when welded together to provide a hermetic sealed interior space for the components of the IMD.

An electrical lead or terminal pin is electrically connected to the IMD by means of attachment to one or more feed-through assemblies that penetrate the container but maintain the hermetically sealed environment thereof. A typical feed-through assembly consists of an external metal part, or frame or ferrule, into which an insulator solid part typically formed of glass, ceramic, polymer, or glass and ceramic is sealed. Within the insulator, one or more metal leads or terminal pins are hermetically sealed. The hermetic sealing of the feed-through assembly typically is achieved by brazing the components using a brazing metal or alloy. Since the reliability of IMD's, such as IPG's, depends in large part on hermetic sealing of the components of the feed-through assemblies, the integrity of such seals is of paramount importance.

Some of the more popular materials employed to form the terminal pin of the feed-through assembly include tantalum and niobium. Unfortunately, tantalum and niobium are susceptible to oxide growth, which can, depending on its extent, act as an insulator instead of a conductor over the surface of the terminal pin. While it has been proposed to use other materials less susceptible to such oxidation from which to form the terminal pin, such materials pose significant challenges as it is often difficult to braze to such materials and thus difficult to form satisfactory hermetic seals. Often, even when satisfactory brazing to the terminal pins has been achieved, the appearance of the braze has been commercially unacceptable.

Accordingly, it is desirable to provide a feed-through assembly of the type used, for example, in IMDs, which comprises a highly conductive, oxidation-resistant terminal pin. It also is desirable to provide a feed-through assembly that maintains a highly reliable hermetic seal. It is further desirable to provide a feed-through assembly with a commercially acceptable appearance. In addition, it is desirable to provide methods for fabricating the aforesaid feed-through assemblies. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

According to an exemplary embodiment of the invention, a feed-through assembly for an IMD is provided. The feed-through assembly has a ferrule having a first aperture disposed therethrough. An insulating member is disposed at least partially within the first aperture. The insulating member has a second aperture, an inside surface and an outside surface. A metallization region overlies at least a portion of the inside surface and at least a portion of the outside surface of the insulating member. The metallization region is formed of a first layer comprising titanium and a second layer comprising niobium. A portion of a terminal pin comprising platinum is disposed within the second aperture. A first brazing seal is disposed between the insulating member and the ferrule and a second brazing seal is disposed between the insulating member and the terminal pin. The first and second brazing seals are formed of gold.

According to another exemplary embodiment of the invention, a method for fabricating a feed-through assembly for an IMD is provided. The method comprises the steps of providing a ferrule having a first aperture disposed therethrough and providing an insulating member having second aperture disposed therethrough, and having an inside surface and an outside surface. A metallization region is deposited overlying at least a portion of the inside surface and at least a portion of the outside surface of the insulating member. The metallization region is formed of a first layer comprising titanium and a second layer comprising niobium. The insulating member is disposed at least partially within the first aperture of the ferrule. A portion of a terminal pin comprising platinum is disposed within the second aperture of the insulating member. A first brazing seal is formed between the ferrule and the insulating member and a second brazing seal is formed between the insulating member and the terminal pin. The first and second brazing seals consist essentially of gold.

According to a further exemplary embodiment of the invention, a feed-through assembly for an IMD has a ferrule with a first aperture disposed therethrough and an insulating member disposed at least partially within the first aperture. The insulating member has a second aperture disposed therethrough, an inside surface and an outside surface. A metallization layer comprising niobium overlies at least a portion of the inside surface and at least a portion of the outside surface of the insulating member. A portion of a terminal pin comprising platinum is disposed within the second aperture. A first brazing seal is disposed between the insulating member and the ferrule. A second brazing seal is disposed between the insulating member and the terminal pin. The first and second brazing seals consist essentially of gold present in an amount of about 70% to about 90% by weight and nickel in an amount of about 30% to about 10% by weight.

According to yet another exemplary embodiment of the invention, a method for fabricating a feed-through assembly for an IMD is provided. The method comprises the steps of providing a ferrule having a first aperture disposed therethrough and providing an insulating member having second aperture disposed therethrough, and having an inside surface and an outside surface. A metallization layer comprising niobium is deposited overlying at least a portion of the inside surface and at least a portion of the outside surface of the insulating member. The insulating member is disposed at least partially within the first aperture of the ferrule and a portion of a terminal pin comprising platinum is disposed within the second aperture of the insulating member. A first brazing seal is formed between the ferrule and the insulating member and a second brazing seal is formed between the insulating member and the terminal pin. The first and second brazing seals consist essentially of gold present in an amount of about 70% to about 90% by weight and nickel in an amount of about 30% to about 10% by weight.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
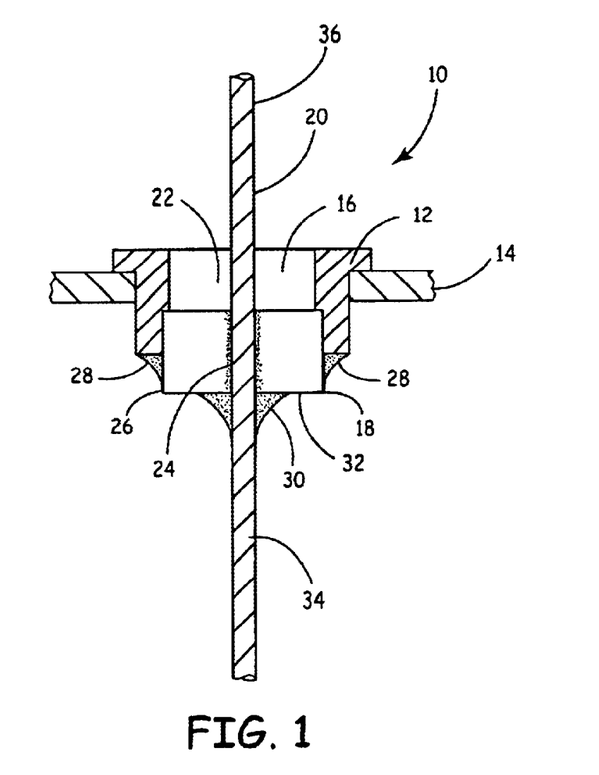
FIG. 1 is a cross-sectional view of a feed-through assembly in accordance with an exemplary embodiment of the present invention.

FIG. 1 illustrates a feed-through assembly 10 in accordance with an exemplary embodiment of the present invention. Feed-through assembly 10 comprises a ferrule 12, which is affixed to a shield or container 14 of an implantable medical device. Ferrule 12 has a first aperture 16 disposed therethrough. Typically, ferrule 12 has an annular configuration but may have any configuration suitable for use with shield or container 14 of the IMD. Ferrule 12 may be formed of titanium, niobium, platinum, molybdenum, tantalum, zirconium, vanadium, tungsten, iridium, rhodium, rhenium, osmium, ruthenium, palladium, any combination thereof, or any other suitable metal or combination of metals. Preferably, ferrule 12 is formed of titanium. Ferrule 12 is affixed to shield or container 14 preferably by welding, although any other suitable means, such as adhesive (e.g., thermoset or other adhesive material) or soldering and the like, may be used.

Feed-through assembly 10 further comprises an insulating member 18, which is disposed at least partially within first aperture 16 of ferrule 12. Insulating member 18 has a second aperture 22 disposed therethrough and which is in a concentric relationship with first aperture 16. Insulating member 18 further has an inside surface 24 and an outside surface 26. Insulating member 18 may be formed of any suitable electrically insulative, ceramic-containing material, such as, for example, alumina or aluminum oxide, sapphire, ruby, or zinc oxide and the like.

Additionally, in one exemplary embodiment of the present invention, feed-through assembly 10 may comprise a terminal pin 20. Terminal pin 20 may extend through second aperture 22 of insulating member 18 and, accordingly, through first aperture 16 of ferrule 12 in a concentric relationship to insulating member 18 and ferrule 12. As described in more detail below, terminal pin 20 is formed of an electrically conductive material. Insulating member 18 provides electrical insulation between ferrule 12 and terminal pin 20. In a typical installation, a first end 34 of terminal pin 20 may extend into the interior of the IMD enclosed by shield or container 14 and make electrical contact with the contents thereof and a second end 36 may extend exteriorly of the IMD. In an alternative embodiment, first end 34 may terminate within or at a surface 32 of insulator 18 and be electrically connected to the contents of the implantable medical deice enclosed by shield or container 14.

Referring briefly ahead to FIGS. 6A-6D, in another exemplary embodiment of the present invention, feed-through assembly 10 may comprise a plurality terminal pins 20 (i.e., n-terminal pins). Accordingly, insulating member 18 may comprise at least n-second apertures 22. Each of the plurality of terminal pins 20 may extend through one of the second apertures 22 within insulating member 18 and, accordingly, through first aperture 16 of ferrule 12. The plurality of terminal pins 20 and, accordingly, the plurality of second apertures 22, may be disposed within insulating member 18 in any suitable arrangement, such as, for example, a linear arrangement, a staggered array, multiple linear rows, one annular ring, concentric annular rings and the like. First ends 34 of the plurality of terminal pins 20 may extend into the interior of the IMD enclosed by shield or container 14 and make electrical contact with the contents thereof and second ends 36 may extend exteriorly of the IMD. Alternatively, some or all of first ends 34 of the plurality of terminal pins 20 may terminate within and/or at surface 32 of insulator 18 and be electrically connected to the contents of the IMD enclosed by shield or container 14.

Feed-through assembly 10 further comprises a first brazing seal 28 that forms a hermetic seal between ferrule 12 and insulating member 18 and a second brazing seal 30 that forms a hermetic seal between insulating member 18 and terminal pin(s) 20. In accordance with one exemplary embodiment of the invention, brazing seals 28 and 30 may be formed of gold, preferably 99.9% by weight gold or purer gold.

Figure 2:
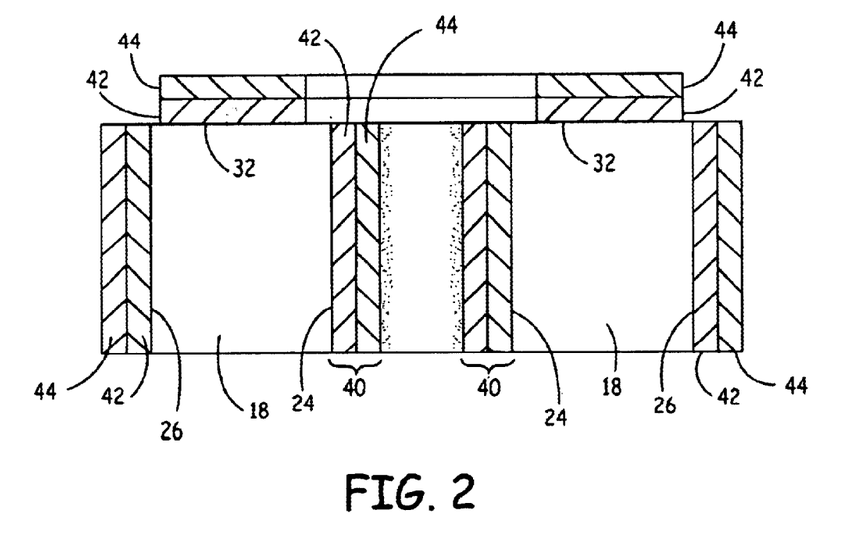
FIG. 2 is a cross-sectional view of a metallization region overlying an insulating member of a feed-through assembly in accordance with an exemplary embodiment of the present invention.

Referring to FIG. 2, in one exemplary embodiment of the present invention, where terminal pin 20 comprises platinum, such as where terminal pin 20 comprises substantially all platinum or where terminal pin 20 comprises a platinum-iridium alloy, feed-through assembly 10 also comprises a metallization region 40 that is disposed overlying at least a portion of inside surface 24 and at least a portion of outside surface 26 of insulating member 18. Metallization region 40 serves to facilitate the brazing of insulating member 18 to ferrule 12 and to terminal pin 20. Metallization region 40 comprises a first layer 42 and a second layer 44. First layer 42 may comprise titanium or niobium and second layer 44 may comprise niobium or titanium, that is, the material forming second layer 44 is different from the material forming first layer 42. Accordingly, in one embodiment of the invention, first layer 42 may comprise niobium and second layer 44 may comprise titanium. In a more preferred embodiment of the invention, first layer 42 may comprise titanium and second layer 44 may comprise niobium. Preferably, the titanium layer, whether first layer 42 or second layer 44, has a thickness in the range of about 2,000 to about 25,000 angstroms. Preferably, the niobium layer, whether first layer 42 or second layer 44, has a thickness in the range of about 2,000 to about 30,000 angstroms. Metallization region 40 has a total thickness in the range of about 12,000 to about 45,000 angstroms and more preferably has a thickness in the range of about 20,000 to 30,000 angstroms. The combination of layers 42 and 44 improves the adhesion of the gold brazing to insulating member 18 and improves the appearance of the gold brazing.

In another exemplary embodiment of the invention, metallization region 40 may also be disposed overlying a portion of an end 32 of insulating member 18 that is disposed proximate brazing seal 30. Metallization region 40 overlying end 32 of insulating member 18 may facilitate formation of brazing seal 30. Metallization region 40 overlying end 32 is physically isolated from metallization region 40 overlying inside surface 24 and outside surface 26 so that insulting member 18 maintains electrical insulation between ferrule 12 and terminal pin 20.

Figure 3:
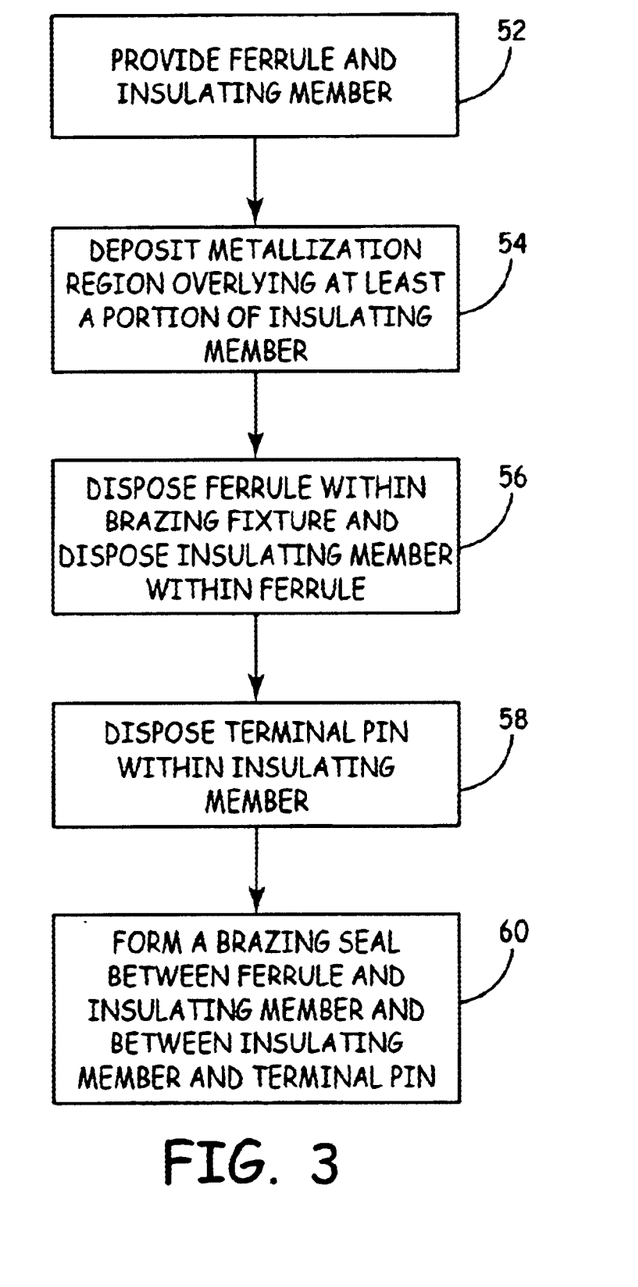
FIG. 3 a flowchart illustrating a method for fabricating a feed-through assembly in accordance with an exemplary embodiment of the present invention.

FIG. 3 illustrates a method 50 for fabricating a feed-through assembly in accordance with an exemplary embodiment of the present invention. In FIG. 3, ferrule 12 and insulating member 18 are provided, step 52. A metallization region 40 then is deposited overlying at least a portion of inside surface 24 and at least a portion of outside surface 26 of insulating member 18, step 54. In another exemplary embodiment of the invention, metallization region 40 may also be deposited overlying at least a portion of end 32 of insulating member 18 in a manner such that metallization region 40 overlying end 32 is physically, and thus electrically, isolated from metallization region 40 overlying inside surface 24 and outside surface 26. Metallization region 40 may be deposited overlying inside surface 24 and outside surface 26 using any suitable deposition process, such as, for example, electron beam deposition, electron-enhanced plasma deposition, chemical vapor deposition, and the like. In a preferred embodiment of the invention, metallization region 40 is deposited onto insulating member 18 by a sputtering technique using DC-magnetron power or radio frequency-power as is well known and practiced in the industry. Radio Frequency sputtering may be accomplished using a Model No. 2400 PERKIN-ELMER® sputtering system or any other commercially available RF-sputtering system. DC magnetron sputtering may be accomplished using a Model No. 944GT sputtering system manufactured by KDF Electronic & Vacuum Services, Inc. of Rockleigh, N.J. or any other commercially available DC-magnetron sputtering system. It will be appreciated, however, that any other suitable deposition technique and system may be employed to form metallization region 40. Metallization region 40 is formed by initially depositing first layer 42 until a desired thickness is achieved and then by depositing second layer 44 until a desired thickness of second layer 44 and/or metallization region 40 is achieved. In a preferred embodiment of the invention, titanium is deposited onto insulating member 18 until a thickness in the range of about 2,000 to about 25,000 angstroms is achieved and then niobium is deposited onto insulating member 18 until metallization region 40 has a thickness in the range of about 12,000 to about 45,000 angstroms, preferably about 20,000 to about 30,000 angstroms.

Figure 4:
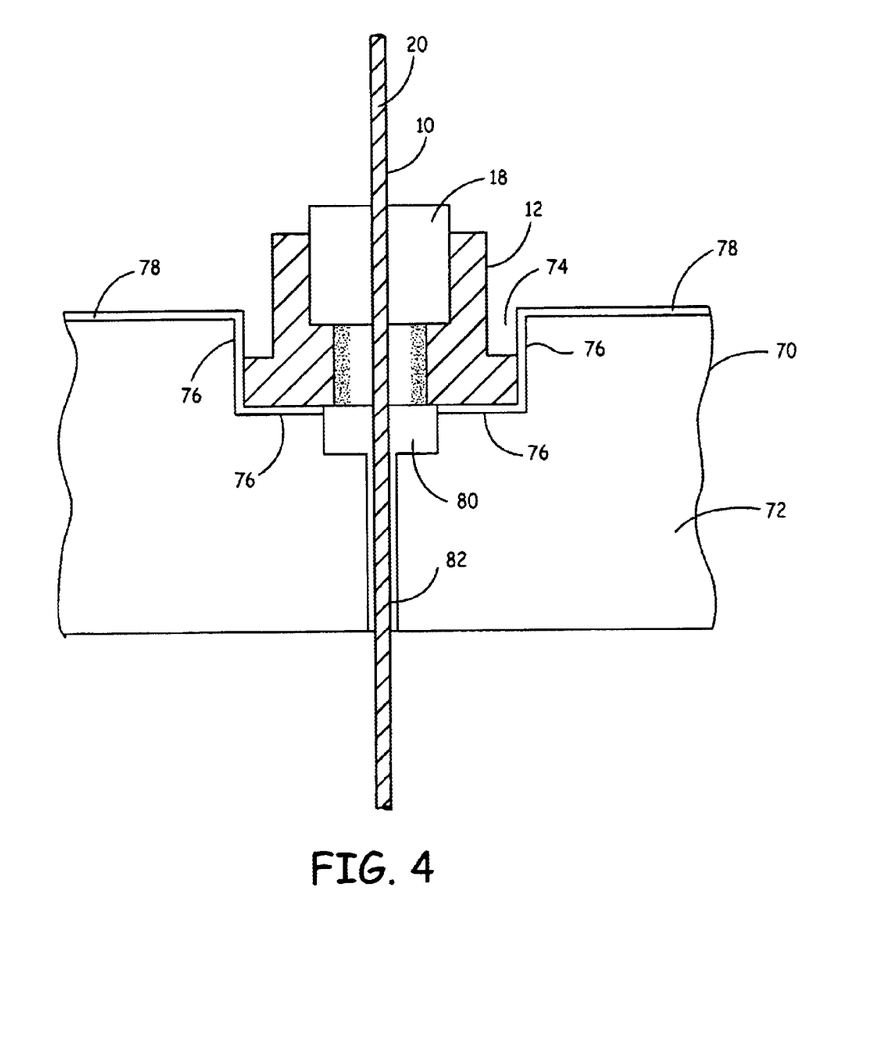
FIG. 4 is a cross-sectional view of a brazing fixture in which is disposed a feed-through assembly in accordance with an exemplary embodiment of the present invention.

After metallization region 40 is formed on insulating member 18, ferrule 12, insulating member 18 and terminal pin(s) 20 are assembled in a brazing fixture, typically a graphite brazing fixture. Referring momentarily to FIG. 4, a brazing fixture 70 used in accordance with an exemplary embodiment of the present invention is illustrated. Brazing fixture 70 comprises a graphite nesting plate 72 that suitably holds assembled ferrule 12, insulating member 18 and terminal pin(s) 20 during brazing to form feed-through assembly 10. While nesting plate 72 is illustrated as employed to fabricate feed-through assembly 10, it will be understood that nesting plate 72, and hence brazing fixture 70, can be employed to fabricate a plurality of feed-through assemblies simultaneously. Nesting plate 72 has a first well 74 in which ferrule 12 is seated. First well 74 has first walls 76 upon which overlies a release coating 78 formed of a suitable release material that reduces the likelihood that ferrule 12 will bond to graphite nesting plate 72 during brazing and that permits ferrule 12 to be easily removed from brazing fixture 70 after the brazing process. Suitable materials for release coating 78 include silicon carbide, aluminum nitride, pyrolytic graphite, and pyrolytic boron nitride. In a preferred embodiment of the invention, release coating 78 comprises silicon carbide. Nesting plate 72 also has a second well 80 that is in communication with and is in concentric relationship to first well 74 and an orifice 82. Orifice 82 is configured to receive terminal pin 20 upon the threading of terminal pin 20 through insulating member 18, as discussed below. Second well 80 is configured to prevent terminal pin 20 from coming in contact with the material of release coating 78, which may reduce the melting point of terminal pin 20 during brazing. Release coating 78 may or may not overlie second well 80. If feed-through assembly 10 has more than one terminal pin, brazing fixture 70 may have at least the same number of orifices 82 to receive the terminal pins 20 upon fabrication of the feed-through assembly, as described below.

Referring again to FIG. 3, in a preferred embodiment of the present invention, ferrule 12 is disposed within the brazing fixture 70 and insulating member 18 is seated within first aperture 16 of ferrule 12, step 56. A first gold preform is threaded onto terminal pin 20 and terminal pin 20 is disposed within second aperture 22 of insulating member 18 and first aperture 16 of ferrule 12, step 58. The first gold preform is seated adjacent end 32 of insulating member 18. If the feed-through assembly is to comprise a plurality of terminal pins, a first gold perform is threaded onto each of the plurality of terminal pins and each of the terminal pins is disposed within a suitable second aperture 22 of insulating member 18. A second gold preform is disposed around outside surface 26 of insulating member 18 adjacent ferrule 12.

Brazing seals 28 and 30 are then formed between ferrule 12 and insulating member 18 and between insulating member 18 and terminal(s) pin 20, step 60. In the brazing step of the present invention, the preforms employed to form brazing seals 28 and 30 are heated to a temperature exceeding about 500° C. In a preferred method of the present invention, the brazing step occurs at peak temperatures in the range of about 1050° C. to about 1150° C., preferably about 1090° C., where feed-through assembly 10 is maintained for about 40 seconds following a preferred heating ramp-up period of about 1 hour during which time feed-through assembly 10 is taken from room temperature to the peak temperature. Additionally, it is preferred that feed-through assembly 10 be pre-heated at a temperature of about 1050° C. for about 2 minutes to stabilize temperatures throughout the brazing furnace and brazing fixture 70 within which assembly 10 is held during the brazing step. Upon heating to their melting points, the preforms become liquid gold which flows between ferrule 12 and insulating member 18 forming brazing seal 28 and between insulating member 18 and terminal pin(s) 20 forming brazing seal 30. A preferred cooling ramp-down period following the peak temperature brazing periods is about one hour. Preferred ramp-up and ramp-down periods of the brazing step of the method of the present invention range between about 20 minutes and about 6 hours. Upon formation of brazing seals 28 and 30, feed-through assembly 10 may be removed from the brazing fixture 70 for subsequent installation in an IMD.

A preferred furnace for the brazing step of the present invention is a Model No. 3040 WORKHORSE® furnace manufactured by Vacuum Industries of Somerville, Mass. It is preferred that the brazing step of the present invention occur in a vacuum or inert atmosphere. If a vacuum is employed in the brazing step, pressures less than about $8 \times 10^{-5}$ Torr are preferred prior to initiating brazing. Less preferably, the brazing step of the present invention may occur in air or other non-inert atmosphere.

Figure 5:
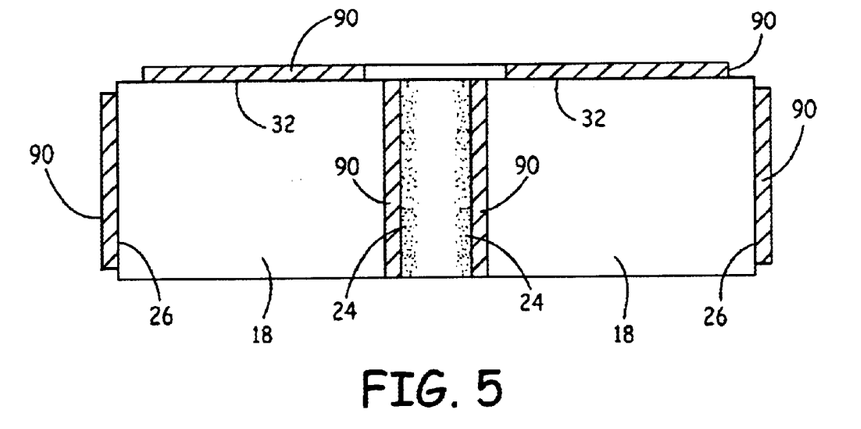
FIG. 5 is a cross-sectional view of a metallization layer overlying an insulating member of a feed-through assembly in accordance with another exemplary embodiment of the present invention.
Figure 6A:
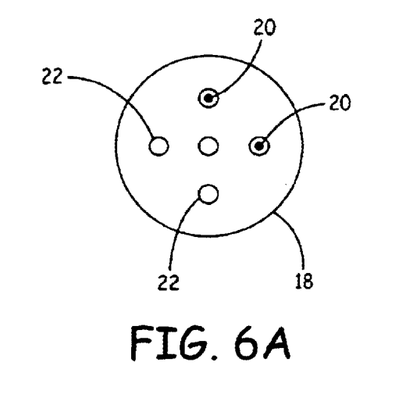
FIGS. 6A-D depict several embodiments of the present invention wherein a each one of a plurality of pins are disposed within a corresponding plurality of apertures.
Figure 6B:
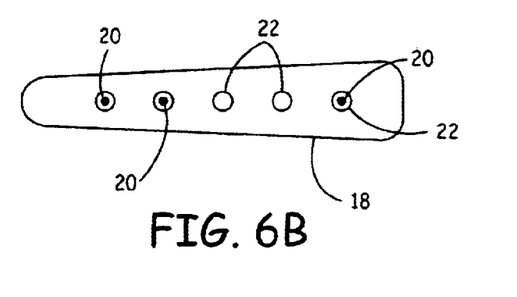
Figure 6C:
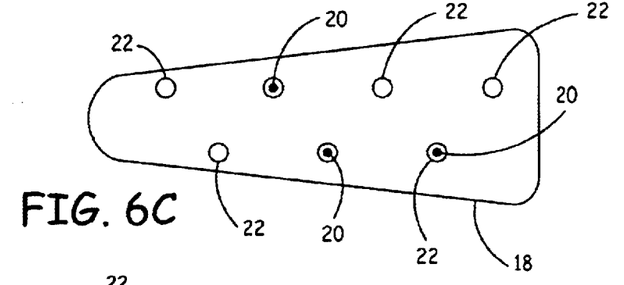
Figure 6D:
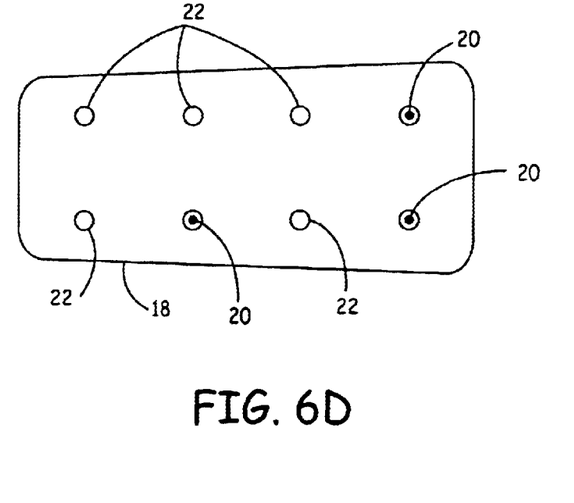

Referring again to FIG. 1, in another exemplary embodiment of the present invention, feed-through assembly 10 may comprise brazing seals 28 and 30 formed of a gold/nickel composition. In this embodiment of the invention, brazing seals 28 and 30 comprise a composition formed of gold present in an amount in the range of about 70 to 90 weight percent and nickel present in an amount in the range of about 30 to 10 weight percent. In a more preferred embodiment of the invention, brazing seals 28 and 30 comprise a composition of about 82% wt. gold and about 12% wt. nickel. In this embodiment, terminal pin(s) 12 comprises platinum. In a preferred embodiment of the invention, terminal pin(s) 12 consists essentially of platinum. Referring to FIG. 5, feed-through assembly 10 further comprises a metallization layer 90 that is deposited overlying at least a portion of inside surface 24 and at least a portion of outside surface 26 of insulating member 18. Metallization layer 90 comprises niobium having a thickness in the range of about 15,000 to about 32,000 angstroms, preferably having a thickness of about 25,000 angstroms.

In another exemplary embodiment of the invention, metallization layer 90 may also be disposed overlying a portion of end 32 of insulating member 18. Metallization layer 90 overlying end 32 of insulating member 18 may facilitate formation of brazing seal 30. Metallization layer 90 overlying end 32 is physically isolated from metallization layer 90 overlying inside surface 24 and outside surface 26 so that insulting member 18 maintains electrical insulation between ferrule 12 and terminal pin 20.

A method similar to the method described above may be used to fabricate the feed-through assembly heretofore described. Again, ferrule 12 and insulating member 18 are provided. Metallization layer 90 then is deposited overlying at least a portion of inside surface 24 and at least a portion of outside surface 26 of insulating member 18. In another exemplary embodiment of the invention, metallization layer 90 may also be deposited overlying a portion of end 32 of insulating member 18 in a manner such that metallization layer 90 overlying end 32 is physically and thus, electrically, isolated from metallization layer 90 overlying inside surface 24 and outside surface 26. Metallization layer 90 may be deposited overlying inside surface 24 and outside surface 26 using any suitable deposition process, such as, for example, electron beam deposition, electron-enhanced plasma deposition, chemical vapor deposition, and the like. In a preferred embodiment of the invention, metallization layer 90 is deposited onto insulating member 18 by a sputtering technique using DC-magnetron power or RF-power as is well known and practiced in the industry. Metallization layer 90 is formed by depositing niobium until a desired thickness is achieved, preferably about 25,000 angstroms.

After metallization layer 90 is formed on insulating member 18, ferrule 12, insulating member 18 and terminal pin 20 are assembled in the brazing fixture 70. In a preferred embodiment of the present invention, ferrule 12 is disposed within the brazing fixture 70 and insulating member 18 is seated within first aperture 16 of ferrule 12. A first gold/nickel preform is threaded onto terminal pin 20 and terminal pin 20 is disposed within second aperture 22 of insulating member 18 and first aperture 16 of ferrule 12. The first gold/nickel preform is seated adjacent end 32 of insulating member 18. If the feed-through assembly is to comprise a plurality of terminal pins, a first gold perform is threaded onto each of the plurality of terminal pins and each of the terminal pins is disposed within a suitable second aperture 22 of insulating member 18. A second gold/nickel preform is disposed around outside surface 26 of insulating member 18 adjacent ferrule 12.

Brazing seals 28 and 30 are then formed between ferrule 12 and insulating member 18 and between insulating member 18 and terminal pin(s) 20. In the brazing step of the present invention, the preforms employed to form brazing seals 28 and 30 are heated to a temperature exceeding about 500° C. In a preferred method of the present invention, the brazing step occurs at peak temperatures in the range of about 930° C. to about 1030° C., preferably about 978° C., where feed-through assembly 10 is maintained for about 40 seconds following a preferred heating ramp-up period of about 1 hour during which time feed-through assembly 10 is taken from room temperature to the peak temperature. Additionally, it is preferred that feed-through assembly 10 be pre-heated at a temperature of about 945° C. for about 2 minutes to stabilize temperatures throughout the brazing furnace and brazing fixture within which assembly 10 is held during the brazing step. Upon heating to their melting points, the preforms become a liquid gold/nickel alloy which flows between ferrule 12 and insulating member 18 forming brazing seal 28 and between insulating member 18 and terminal pin(s) 20 forming brazing seal 30. A preferred cooling ramp-down period following the peak temperature brazing periods is about one hour. Preferred ramp-up and ramp-down periods of the brazing step of the method of the present invention range between about 20 minutes and about 6 hours. Upon formation of brazing seals 28 and 30, feed-through assembly 10 may be removed from the brazing fixture for subsequent installation in an IMD.

While at least one exemplary embodiment has been presented in the foregoing detailed description of the invention, it should be appreciated that a vast number of variations exist. For example, while many ranges and dimensions have been described herein other ranges and dimensions may be utilized without loss of the benefits provided by the present invention. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A feed-through assembly, comprising:
    a ferrule having a first aperture disposed therethrough;
    an insulating member disposed at least partially within said first aperture, said insulating member having a second aperture, an inside surface and an outside surface;
    a metallization region overlying at least a portion of said inside surface and at least a portion of said outside surface of said insulating member, said metallization region formed of a first layer comprising titanium and a second layer comprising niobium;
    a terminal pin, a portion of which is disposed within said second aperture, said terminal pin comprising platinum; and
    a first brazing seal disposed between said insulating member and said ferrule and a second brazing seal disposed between said insulating member and said terminal pin, said brazing seal consisting essentially of gold.

2. A feed-through assembly according to claim 1, wherein said ferrule comprises at least one of titanium, niobium, platinum, molybdenum, tantalum, zirconium, vanadium, tungsten, iridium, rhodium, rhenium, osmium, ruthenium, and palladium.

3. A feed-through assembly according to claim 1, wherein said metallization region overlies at least a portion of an end of said insulating member.

4. A feed-through assembly according to claim 1, wherein said terminal pin consists essentially of a material selected from the group comprising platinum or a platinum-iridium composition.

5. A feed-through assembly according to claim 1, wherein said first and second brazing seals comprise at least 99.9 weight % gold.

6. A feed-through assembly according to claim 1, wherein said first layer of said metallization region contacts said insulating member.

7. A feed-through assembly according to claim 1, wherein said first layer has a thickness in the range of about 2,000 to 25,000 angstroms.

8. A feed-through assembly according to claim 1, wherein said metallization region has a thickness in the range of about 12,000 to about 45,000 angstroms.

9. A feed-through assembly according to claim 8, wherein said metallization region has a thickness in the range of about 20,000 to about 30,000 angstroms.

10. A feed-through assembly according to claim 1, further comprising a plurality of said terminal pins, said insulating member comprising a plurality of said second apertures, wherein a portion of each of said plurality of said terminal pins is disposed within one of said plurality of said second apertures.

11. A method for fabricating a feed-through assembly, the method comprising the steps of:
    supplying a ferrule having a first aperture disposed therethrough;
    supplying an insulating member having a second aperture disposed therein, an inside surface and an outside surface;
    depositing a metallization region overlying at least a portion of said inside surface and at least a portion of said outside surface of said insulating member, said metallization region formed of a first layer comprising titanium and a second layer comprising niobium;
    inserting said insulating member at least partially within said first aperture of said ferrule;
    inserting a portion of a terminal pin within said second aperture of said insulating member, said terminal pin comprising platinum;
    brazing a first seal between said ferrule and said insulating member; and
    brazing a second seal between said insulating member and said portion of said terminal pin, wherein said first seal and said second seal consist essentially of gold.

12. A method according to claim 11, wherein said step of supplying a ferrule comprises providing a ferrule formed of at least one of titanium, niobium, platinum, molybdenum, tantalum, zirconium, vanadium, tungsten, iridium, rhodium, rhenium, osmium, ruthenium, and palladium.

13. A method according to claim 11, wherein said step of depositing a metallization region comprises depositing said first layer in contact with said insulating member.

14. A method according to claim 11, wherein said step of depositing a metallization region comprises depositing said first layer to a thickness in the range of about 2,000 to 25,000 angstroms.

15. A method according to claim 11, wherein said step of depositing a metallization region comprises depositing said metallization region to a thickness in the range of about 12,000 to about 45,000 angstroms.

16. A method according to claim 15, wherein said step of depositing said metallization region comprises depositing said metallization region to a thickness in the range of about 20,000 to 30,000 angstroms.

17. A method according to claim 11, wherein said step of brazing said first seal and said second seal comprises forming said first and second brazing seals of at least 99.9 weight % gold.

18. A method according to claim 11, wherein said step of forming said first and second brazing seals comprises:
    disposing a first gold preform about said terminal pin adjacent said insulating member and disposing a second gold preform about said outside surface of said insulating member adjacent said ferrule; and
    heating said first and second gold preforms to a temperature in the range of about 1050° C. and 1150° C.

19. A method according to claim 11, wherein said step of disposing a portion of a terminal pin comprises disposing a portion of a terminal pin and wherein said terminal pin consists essentially of a material selected from the group comprising platinum and a platinum-iridium composition.

20. A method according to claim 11, wherein said step of supplying an insulating member comprises providing an insulating member having a plurality of second apertures, and wherein said step of inserting a portion of a terminal pin comprises disposing a portion of a terminal pin within each of said plurality of second apertures, and wherein said step of brazing a second seal comprises forming the second seal between said insulating member and said portions of said terminal pins disposed therein.

21. A feed-through assembly, comprising:
a ferrule having a first aperture disposed therethrough;
an insulating member disposed at least partially within said first aperture, said insulating member having a second aperture disposed therethrough, an inside surface and an outside surface;
a metallization layer overlying at least a portion of said inside surface and at least a portion of said outside surface of said insulating member, said metallization layer comprising niobium;
a terminal pin, a portion of which is disposed within said second aperture, said terminal pin comprising platinum; and
a first brazing seal disposed between said insulating member and said ferrule and a second brazing seal disposed between said insulating member and said terminal pin, said first and second brazing seals consisting essentially of gold present in an amount of about 70% to about 90% by weight and nickel in an amount of about 30% to about 10% by weight.

22. A feed-through assembly according to claim 21, wherein said ferrule comprises at least one of titanium, niobium, platinum, molybdenum, tantalum, zirconium, vanadium, tungsten, iridium, rhodium, rhenium osmium, ruthenium, and palladium.

23. A feed-through assembly according to claim 21, wherein said metallization layer overlies at least a portion of an end of said insulating member.

24. A feed-through assembly according to claim 21, wherein said metallization layer has a thickness in the range of about 15,000 to 32,000 angstroms.

25. A feed-through assembly according to claim 24, wherein said metalization layer has a thickness of about 25,000 angstroms.

26. A feed-through assembly according to claim 21, wherein said first and second brazing seals consisting essentially of gold present in an amount of about 82% by weight and nickel in an amount of about 18% by weight.

27. A feed-through assembly according to claim 21, wherein said terminal pin consists essentially of platinum.

28. A feed-through assembly according to claim 21, further comprising a plurality of said terminal pins, wherein said insulating member comprises a plurality of said second apertures, and wherein a portion of each of said plurality of said terminal pins is disposed within one of said plurality of said second apertures.

29. A method for fabricating a feed-through assembly, the method comprising the steps of:
supplying a ferrule having a first aperture disposed therethrough;
supplying an insulating member having a second aperture disposed therethrough, an inside surface and an outside surface;
depositing a metallization layer overlying at least a portion of said inside surface and at least a portion of said outside surface of said insulating member, said metallization layer comprising niobium;
inserting said insulating member at least partially within said first aperture of said ferrule;
inserting a portion of a terminal pin within said second aperture of said insulating member, said terminal pin comprising platinum;
brazing a first seal between said ferrule and said insulating member; and
brazing a second seal between said insulating member and said portion of said terminal pin, wherein said first and second brazing seals consisting essentially of gold present in an amount of about 70% to about 90% by weight and nickel in an amount of about 30% to about 10% by weight.

30. A method according to claim 29, wherein said step of supplying a ferrule comprises providing a ferrule formed of at least one of titanium, niobium, platinum, molybdenum, tantalum, zirconium, vanadium, tungsten, iridium, rhodium, rhenium, osmium, ruthenium, and palladium.

31. A method according to claim 29, wherein said step of depositing a metallization layer comprising depositing said metallization layer to a thickness in the range of about 15,000 to about 32,000 angstroms.

32. A method according to claim 31, wherein said step of depositing said metallization layer comprises depositing said metallization layer to a thickness of about 25,000 angstroms.

33. A method according to claim 29, said steps of brazing the first seal and the second seal comprises forming said first and second seals consisting essentially of gold present in the amount of about 82% by weight and nickel in the amount of about 18% by weight.

34. A method according to claim 29, said brazing steps comprise:
disposing a first gold/nickel preform about said terminal pin adjacent said insulating member and disposing a second gold/nickel preform about said outside surface of said insulating member adjacent said ferrule; and
heating said first and second gold/nickel preforms to a temperature in the range of about 930° C. and 1030° C.

35. A method according to claim 29, wherein said step of inserting a portion of the terminal pin comprises disposing a portion of a terminal pin wherein said terminal pin consists essentially of platinum.

36. A method according to claim 29, wherein said step of supplying an insulating member comprising providing an insulating member having a plurality of second apertures, said step of inserting a portion of a terminal pin comprising disposing a portion of a terminal pin within each of said plurality of second apertures, and said step of brazing the second seal comprises forming the second seal between said insulating member and said portions of said terminal pins disposed therein.

* * * * *